US005283752A

United States Patent [19]

Gombault et al.

[11] Patent Number: 5,283,752

[45] Date of Patent: Feb. 1, 1994

[54] METHOD OF PREPARING AN ITEM TO BE MAILED AND SYSTEM FOR CARRYING OUT THAT METHOD

[75] Inventors: Jacobus F. Gombault, Drachten; Gerhard Hidding, Heerenveen, both of Netherlands

[73] Assignee: Hadewe B.V., Drachten, Netherlands

[21] Appl. No.: 44,118

[22] Filed: Apr. 8, 1993

Related U.S. Application Data

[63] Continuation of Ser. No. 541,310, Jun. 21, 1990, abandoned.

[30] Foreign Application Priority Data

Jun. 21, 1989 [NL] Netherlands ........................ 8901557

[51] Int. Cl.[5] ........................ G06F 15/20; B65H 39/02

[52] U.S. Cl. ................................ 364/478; 364/464.02; 270/1.1; 270/58; 235/375

[58] Field of Search .............. 364/478, 464.01, 464.02, 364/464.03; 209/900, 569, 583, 584, 3.1-3.3; 270/1.1, 4, 5, 54, 58; 235/375

[56] References Cited

U.S. PATENT DOCUMENTS

| | | | |
|---|---|---|---|
| 4,308,579 | 12/1981 | Dlugos | 364/200 |
| 4,544,146 | 10/1985 | Zemke et al. | 270/58 |
| 4,797,832 | 1/1989 | Axelrod et al. | 364/478 |
| 4,800,505 | 1/1989 | Axelrod et al. | 364/478 |
| 4,962,454 | 10/1990 | Sansone et al. | 364/464.02 |

FOREIGN PATENT DOCUMENTS

| | | |
|---|---|---|
| 0265192 | 4/1988 | European Pat. Off. . |
| 2202660 | 9/1988 | United Kingdom . |

OTHER PUBLICATIONS

Dutch International-Type Search Report; Mar. 1990.

*Primary Examiner*—Joseph Ruggiero
*Attorney, Agent, or Firm*—Burns, Doane, Swecker & Mathis

[57] ABSTRACT

The invention relates to a method of preparing an item to be mailed using a printer in which a main document is printed and a line of mail preparation stations comprising an inserter station, responsive to an output, comprising instructions for controlling the printer and the mail preparation stations, said instructions for controlling the mail preparation stations being detected and fed to those mail preparation stations. According to the invention the main document is fed directly from the printer to the mail preparation stations and the supply of the instructions for controlling the mail preparation stations is carried out in accordance with the printing of the main document. Further, an apparatus according to the invention is set forth, to be used for carrying out the method according to the invention.

18 Claims, 1 Drawing Sheet

METHOD OF PREPARING AN ITEM TO BE MAILED AND SYSTEM FOR CARRYING OUT THAT METHOD

Figure 1:
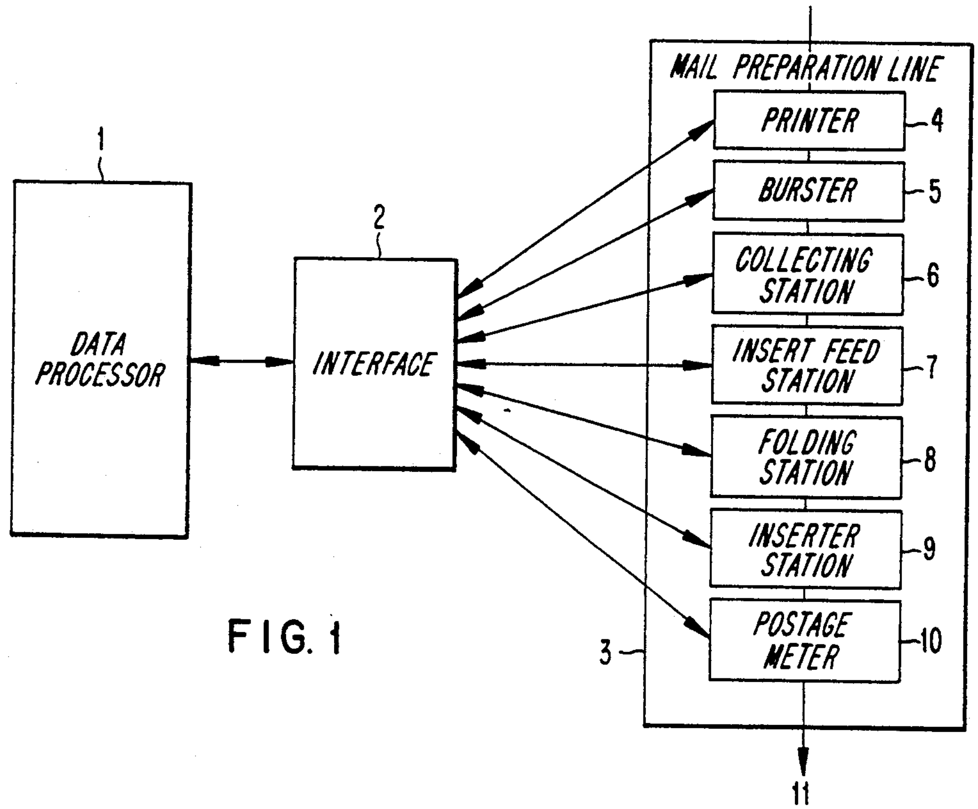

This application is a continuation of application Ser. No. 07/541,310, filed Jun. 21, 1990 abandoned.

The invention relates to a method of preparing an item to be mailed using a printer in which a main document is printed and a line of mail preparation stations comprising an inserter station, responsive to an output comprising instructions for controlling the printer and the mail preparation stations said instructions for controlling the mail preparation stations being detected and fed to those mail preparation stations.

Such a method is known from GB-A-2,202,660. In the method known from that publication the main documents are each provided with markings which form an identification code, and the detected instructions for controlling the mail preparation stations are stored as a base which is supplied with an identification code which corresponds with the printed identification code. The instructions for controlling the mail preparation stations may comprise instructions for controlling a burster, an insert feed station, an address printer and a postage meter.

When, for instance in the mail room, the main documents are fed to the mail preparation line, they are passed along a scanner which periodically reads the identification code provided on them. Depending on which identification code is read, periodically the instructions stored as the corresponding base are fed to the mail preparation stations.

Although markings which form an identification code may be smaller than markings which themselves comprise the instructions for controlling the mail preparation stations, the presence of such markings nevertheless constitutes a disturbing element on the main document, because they are not relevant for the user of the main document and because the space where the markings are provided cannot be used for any other printing.

A further drawback of using markings is that the mail preparation line requires a scanner for reading the markings.

A method in which the user will find the presence of markings less disturbing is set forth in EP-A-0,265,192, where the identification markings are so designed, dimensioned and positioned that they will not be noticed by the user.

It is an object of the invention to provide a method of preparing items to be mailed in which it is unnecessary to provide markings on the sheets.

A further object of the invention is to change as little as possible the methods known and used heretofore, such as described above, so as to allow those methods and the apparatus used in them to be adapted through a minimum of steps, in such a way that the problems described hereinabove will be avoided.

This is accomplished in virtue of the fact that a method of the type described in the preamble is characterized according to the invention in that the main document is fed directly from the printer to one of the mail preparation stations and the supply of the instructions for controlling the mail preparation stations is carried out in accordance with the printing of the main document.

These steps make it possible for the mail preparation stations to be controlled independently of the printing and subsequent reading of markings, the drawbacks discussed hereinabove thus being avoided. The mail preparation stations are controlled more directly in that the output is directly converted into control signals for the corresponding mail preparation stations, without the detour via printing and reading. Surprisingly, therefore, it has turned out to be possible to avoid the drawbacks discussed by choosing a shorter route in the existing methods, which also brings with it the advantage that those known methods can be adapted without any major changes. Furthermore, the use of this inventive, shorter route eliminates a source of possible disturbances, since it rules out disturbances owing to the incorrect or incomplete printing and/or reading of the printed markings.

An additional advantage of the invention is that a considerably smaller number of sets of instructions each belonging to a main document need to be stored at the same time.

Preferably, periodically a next main document is printed after the preceding main document has been fed to the intended mail preparation station, so that at most the instructions belonging to one main document need to be stored.

In further elaboration of the method according to the invention the detected instructions, which are converted into control signals, are removed from the output fed to the printer. When in accordance with a further embodiment of the invention the instructions removed from the output are replaced with printing instructions, for instance to leave at least one line or a part thereof blank, the initial addition of the instructions to the output may advantageously be accomplished in the space of the first line of a document, since this line is usually blank. Instead of removing the instructions for printing processing instructions it is also possible, and in accordance with a further embodiment of the invention, for the detected instructions to be chosen or processed in such a way that they are not recognized by the printer as printing instructions.

In virtue of the fact that in principle it is possible to maintain the original output method where the instructions for controlling at least one mail preparation station are fed in the form of printing instructions for printing the markings comprising coded information for controlling a mail preparation station, it is advantageously possible, and in accordance with a further embodiment of the method according to the invention, for the detected printing instructions for printing the markings to be partly removed or converted into instructions which effect no printing and to be partly passed on to the printer in unmodified form for printing one or more markings. This procedure is particularly advantageous when the main documents are to be removed from the mail preparation line temporarily, for instance for a special check, or to be signed or the like.

As noted, preferably the basic system of the existing mail preparation lines is changed as little as possible In this connection it is preferable, and in accordance with a further embodiment of the invention, for the output from the data processor to be fed to an interface, which from the output received generates separate information streams to the printer and the various mail preparation stations. Further control is possible when in accordance with a further elaboration of the invention it is arranged for the interface to be further fed with signals coming from the printer and the mail preparation stations, which permits the control of the printer and the stations mentioned and the output from the data processor to be regulated depending on the course of the processes in one or more stations. The process can be further automated and controlled when signals are fed to the interface which come from further apparatus, such as means for monitoring technical failure, completeness or packet thickness, which influence the progress of the process in the mail preparation line.

A further advantage of the use of an interface is that at the interface additional information can be added, which can be coupled to the output. Thus at the interface further preparation instructions can be added to the output coming from the data processor.

The invention also relates to a system for carrying out the method according to the present invention, i.e., to a system for preparing an item to be mailed, comprising a printer and a mail preparation line comprising an inserter station and any further mail preparation stations, such as a burster, an insert feed station, an address printer, a postage meter and the like, the printer being linked through a line to a data processor capable of generating an output for controlling the mail preparation line.

In such a system it is proposed in accordance with the invention to include in the line between the data processor and the printer an interface which is linked to at least one of the mail preparation stations through a further line.

Preferably the interface is provided with further input means for instructions. It will be clear that the interface may be accommodated in the housing of the printer or in the same housing as the data processor and that the printer may be accommodated in the mail preparation line.

Figure 2:
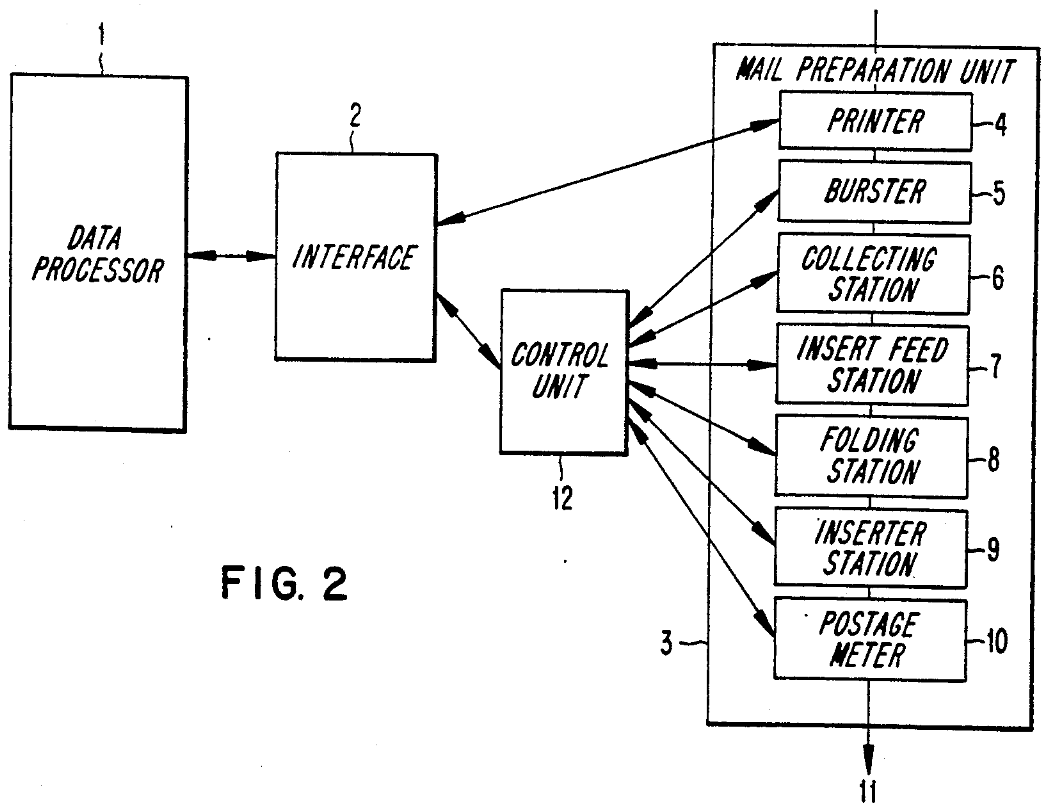

The mail preparation method and system according to the invention will now be further explained and illustrated with reference to the drawings, schematically showing some embodiments, in which:

FIG. 1 shows a first embodiment of a mail preparation system according to the invention; and FIG. 2 shows a second embodiment.

In FIG. 1 the block designated by reference numeral 1 represents a data processor in which the information for preparing and assembling a plurality of documents is stored. The arrows between the blocks each represent a line for passing on information.

Linked to the data processor 1 is an interface 2 which is arranged upstream of a mail preparation line 3 comprising, in the present embodiment of the invention, a printer 4, a burster 5, a collecting station 6, an insert feed station 7, a folding station 8, an inserter station 9 and a postage meter 10. It is stressed that the type, the number, and the sequence of the apparatuses constituting the mail preparation line are exclusively referred to by way of example and can in many ways be varied and adapted to particular uses. Arrow 11 indicates the direction in which the processing of sheets, envelopes, and enclosures into items to be mailed proceeds.

It is observed that the use of a burster 5 in principle implies printing on continuous forms. Naturally it is also possible to use a printer that works with loose sheets, such as most laser printers. In that case the burster 5 may be omitted.

The information about the documents to be produced is generated by the data processor 1 in the form of printing instructions for the printer 4. A part of the printing instructions is directed to the printing of markings which can be read before or in the collecting station 6 and subsequently could be converted into control instructions for the various mail preparation stations.

The output coming from the data processor 1 is fed to the interface 2 which detects the instructions for controlling the mail preparation stations from this output and converts them into control signals which are passed on to the stations in question. The detected and converted instructions are removed from the output or replaced with instructions for printing a blank space or line or a text, such as a standard headline.

As noted above, the instructions for controlling the mail preparation stations which are converted into control signals, are passed on to the stations 5-10. These control signals are to lead to the desired treatment the moment the documents or a set of documents belonging together have reached the station which the instructions relate to. When a number of documents or sets of documents which are to be kept separate are simultaneously present in the mail preparation line, the moment at which the treatment in question is to be carried out can be determined extremely reliably by means of the interface 2 and feedback signals returned to it from the stations or using synchronisation signals generated by the interface 2 itself. In the latter case the feedback of signals from the stations 5-10 to the interface 2 may optionally be omitted. It is recommendable, however, at least to provide for technical failure to be monitored and reported to the interface 2 to permit the mail preparation line 3 to be stopped automatically in the case of technical failure.

In some cases it is desired that the printed documents are first removed from the mail preparation line 3 for them to be further processed manually, for instance to be signed. It may also happen that the printed sheets are to be processed in a mail preparation line elsewhere. In such cases it may be preferable to print the instructions for controlling certain mail preparation stations anyway, i.e., to provide certain optically visible and readable markings on the documents. To this end the instructions in question can be added to the output. This can be done by adding those instructions to the output in the data processor 1. This may also be done at the interface 2, to which end it may be provided with a separate input. It is preferable to provide such an input not just for this purpose, but also for optionally coupling additional processing instructions to the output, for instance standard instructions relating to the preparation of a batch of items to be mailed.

FIG. 2 shows one of the possible variants of the apparatus according to FIG. 1, like parts being designated by like reference numerals in both Figures. Accordingly, a data processor 1 is provided in which information for preparing a plurality of documents is stored, which information partly consists of printing instructions and partly of instructions for the assembly of sets of documents. The instructions referred to are passed on to an interface 2, which in turn is capable of separating from the output at least a part of the instructions for assembling sets of documents or for controlling one or a plurality of the mail preparation stations 5-10. As in the case of the embodiment according to FIG. 1, the printing instructions are passed on from the interface 2 to the printing apparatus 4. The separated instructions for controlling the mail preparation stations are passed on by the interface 2 to a control unit 12 which feeds the instructions to the mail preparation stations concerned. Such an embodiment of the apparatus may for instance be advantageous when a known apparatus is to be adapted in which the control unit 12 originally received its instructions from a reading apparatus which detected the markings provided on the documents by the printer.

To obtain a set of documents, as shown in FIGS. 1 and 2, a collecting station 6 may be arranged in the mail preparation line 3 directly after the printer 4 or, in the case of continuous paper, after the burster 5. Thus the assembly of a set of documents can be accomplished without printing the corresponding markings on the separate documents by converting the corresponding instructions directly into control signals in accordance with the present invention. When the set comprises a letter to be signed, for instance, it may to that end be removed from the mail preparation line by a corresponding control action in the collecting station or any other successive mail preparation station. When afterwards the set is to re-enter the mail preparation line or another mail preparation line, it is preferable to have the printer referred to above print further preparation instructions on the documents in the form of markings. In that case, therefore, a part of the instructions is directly converted into control signals and another part into markings. When in such a case an apparatus according to FIG. 2 is used, a control unit 12 may be provided which can be fed with information by the interface 2 and by a reading apparatus (not shown). Then all the desired treatments can be carried out with a minimum of markings being printed on the documents.

It will be clear that many modifications and variants will readily occur to a person skilled in the art without departure from the invention. As already noted, the mail preparation line may comprise any desired number of parts of any desired type arranged in any desired sequence. Further, each of the arrows designating the flow of information between the various parts of the apparatus is provided with arrowheads, at its two ends, to indicate that feedback signals can be generated so as to obtain optimum control of the apparatus. Such feedback signals may comprise all kinds of information, such as the completion of a certain process step, the passage of a document or set of documents, the report of technical failure, etc.

Further, in the drawings the interface is invariably represented as a separate unit. It will be clear that the interface can also be accommodated in the housing of the printer or in the same housing as the data processor or the control unit which in turn may be accommodated in another housing, such as that of the printer. In other words, the block units shown in the drawings need not be seen as material units. In fact, all units can in principle be accommodated in one single housing.

We claim:

1. A method for preparing an item to be mailed, comprising the steps of:

outputting a set of instructions to a mail preparation line, the mail preparation line including a printer and one or more stations of the mail preparation line, the set of instructions including instructions for controlling the printer and associated instructions for controlling the one or more stations, the instructions for controlling the printer and the associated instructions being outputted at the same time;

subsequently printing a document in accordance with the instructions for controlling the printer;

subsequently directly feeding individual printed documents from the printer to the one or more stations;

supplying operating instructions to the one or more stations in accordance with the associated instructions for controlling the one or more stations and in accordance with the printing of the documents and the feeding of the printed documents form the printer to the one or more stations; and subsequently processing the printed documents in accordance with the associated instructions for controlling the one or more stations.

2. A method according to claim 1, the outputting step further comprising supplying he set of instructions to the printer and removing the associated instructions for controlling the one or more stations from the set of instructions supplied to the printer.

3. A method according to claim 2, comprising the further step of replacing the associated instructions for controlling the one or more stations that are removed from the set of instructions supplied to the printer with printing instructions which cause the printer to print a blank portion of the printed document.

4. A method according to claim 1, wherein the operating instructions are not recognized by the printer as printing instructions.

5. A method according to claim 1, the outputting step further comprising supplying the associated instructions for controlling the one or more stations in the form of printing instructions for printing coded information for controlling at least one mail preparation station, and converting the instructions for printing coded information into instructions that do not effect any printing and are partly passed on to the printer in unmodified form to effect the printing of one or more markings.

6. A method according to claim 1, the outputting step further comprising outputting the set of instructions from a data processing and receiving the output set of instructions at an interface, and the interface generating, from the set of instructions received, separate information streams to the printer and the one or more stations.

7. A method according to claim 6, the outputting step further comprising feeding the interface with signals from and printer and the one or more stations, for control of the printer and the one or more stations, and regulating the output of the data processor depending on the signals from the printer and the one or more stations.

8. A method according to claim 6, the outputting step further comprising feeding signals to the interface from control apparatus, and the interface generating further signals in response to the signals to influence the printing of the printed document and the processing of the printed document.

9. A method according to claim 6, the outputting step further comprising adding, at the interface, additional information, and coupling the additional information to at least one of the separate information streams.

10. The method according to claim 1, the supplying step further comprising supplying the operating instructions to the one or more stations before the document is printed.

11. The method according to claim 1, the supplying step further comprising supplying the operating instructions to the one ore more stations before the individual printed documents are directly fed from the printer to the one or more stations.

12. A system for preparing items to be mailed, comprising:

a mail preparation line comprising a printer and one or more stations including an inserter station;

means for directly feeding individual documents from the printer to a first subsequent one of the one or more stations;

a data processor for generating a set of instructions including instructions for controlling the printer and associated instructions for controlling the one or more stations, the instructions for controlling the printer and the associated instructions being generated at the same time; and an interface connected between the data processor and the printer and interconnected with the one or more stations, the interface supplying operating instructions for controlling the one or more stations in accordance with the associated instructions and in accordance with the printing of documents by the printer and the feeding of printed documents to the one or more stations.

13. A system according to claim 12, the interface further comprising input means for inputting further instructions.

14. A method for preparing an item to be mailed, comprising the steps of:

outputting a set of instructions for controlling a mail preparation line to an interface, the mail preparation line including a printer and one or more stations of a mail preparation line, the set of instructions including first instructions for controlling the printer and associated instructions for controlling the one or more stations of the mail preparation line;

subsequently supplying second instructions for controlling the printer in accordance with the first instructions for controlling the printer from the interface to the printer;

printing a document in accordance with the second instructions for controlling the printer;

subsequently directly feeding individual printed documents from the printer to the one or more stations;

supplying operating instructions from the interface to the one or more stations in accordance with the associated instructions for controlling the one or more stations and in accordance with the printing of the documents and the feeding of the printed documents from the printer to the one or more stations; and subsequently processing the printed documents in accordance with the associated instructions for controlling the one or more stations.

15. A method according to claim 14, comprising the further step of feeding the interface with signals from the printer and the one or more stations, for control of the printer and the one or more stations, and regulating the output of the data processor depending on the signals from the printer and the one or more stations.

16. A method according to claim 14, comprising the further step of feeding the interface with signals from control apparatus, the interface generating further signals in response to the signals from the control apparatus to influence the printing of the printed document and the processing of the printed document.

17. A method according to claim 14, the step of supplying operating instructions including supplying operating instructions to the one or more stations before the document is printed.

18. A method according to claim 14, the step of supplying operating instructions including supplying operating instructions to the one or more stations before the individual printed documents are directly fed from the printer to the one or more stations.

* * * * *